Figure 1:
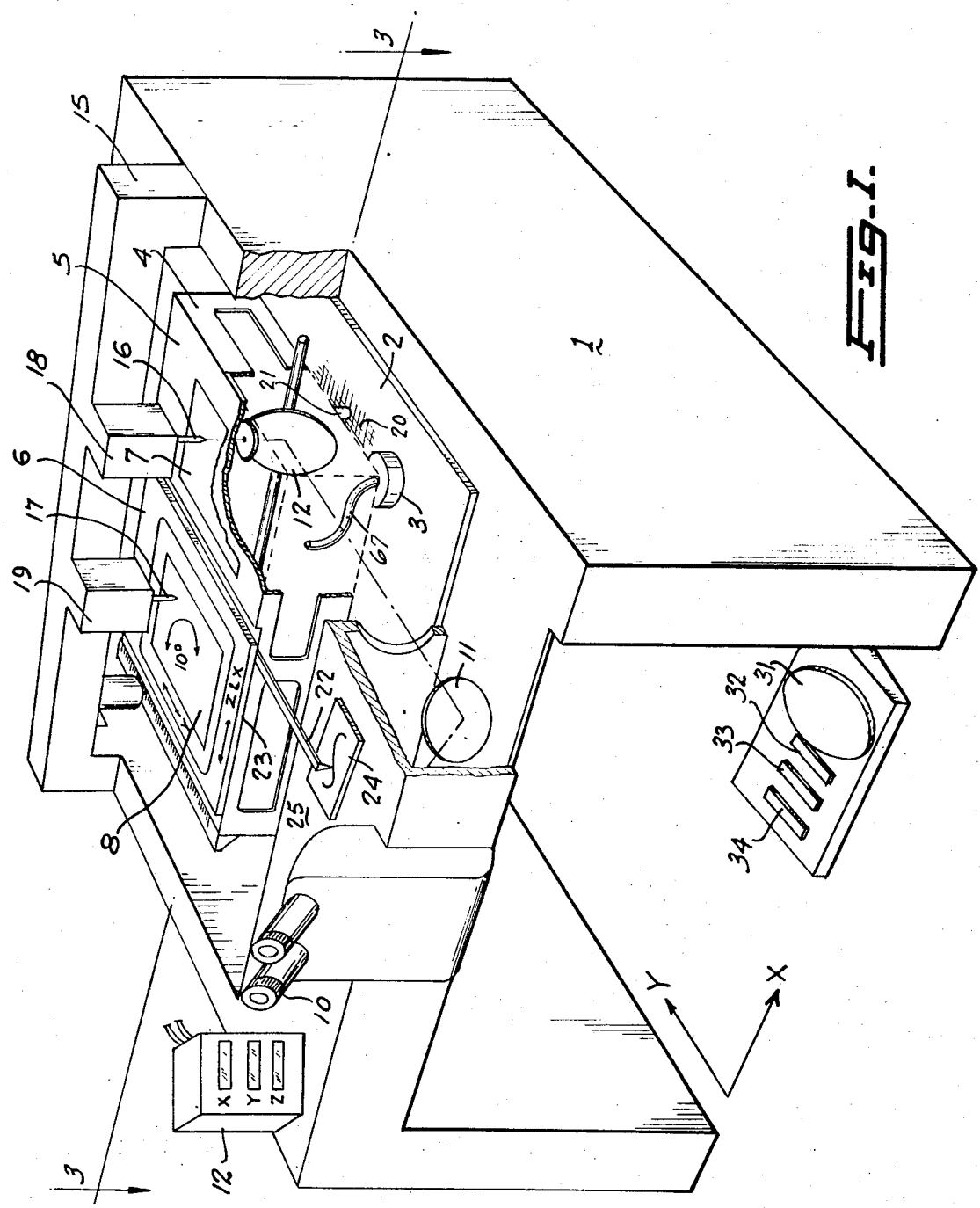

United States Patent [19]
Blachut et al.

[11] 3,729,830
[45] May 1, 1973

[54] STEREOCOMPLIER

[75] Inventors: Theodore J. Blachut, Ottawa, Ontario; Manfred Paulun, Kirk Ferry, Quebec, both of Canada; Angel Garcia Amaro, Mexico City, Mexico

[73] Assignee: Canadian Patents and Development Limited, Ottawa, Ontario, Canada

[22] Filed: Jan. 18, 1971

[21] Appl. No.: 106,995

[30] Foreign Application Priority Data

Jan. 19, 1970 Canada..................................072475

[52] U.S. Cl. ....................................33/20 D, 33/23 C
[51] Int. Cl. ................................................B43i 13/16
[58] Field of Search ...................33/18 R, 20 D, 1 A, 33/20 R, 23 C

[56] References Cited

UNITED STATES PATENTS

| | | | |
|---|---|---|---|
| 2,535,213 | 12/1950 | Kail | 33/20 D |
| 2,481,246 | 9/1949 | Schlatter | 33/20 D |
| 2,555,106 | 5/1951 | Beazley | 33/20 D |
| 1,894,148 | 1/1933 | Barr | 33/1 A |
| 2,960,006 | 11/1960 | Bartorelli | 33/20 D |

Primary Examiner—Harry N. Haroian
Attorney—Cushman, Darby & Cushman

[57] ABSTRACT

A photogrammetric method and apparatus for the stereoscopic examination and preparation of maps of featured surfaces in which a pair of stereo images is mounted on a carriage and a three dimensional measuring mark can be brought into conjunction with features on the three dimensional optical model produced from the stereo pair. Marking means are provided so that as the measuring mark means and the optical model are moved relatively to one another, drafting can be carried out on one or both of the stereo image pair. The apparatus can also provide for the recording of co-ordinate data of points on the model moved into conjunction with the measuring mark means.

13 Claims, 4 Drawing Figures

Patented May 1, 1973

3,729,830

3 Sheets-Sheet 1

STEREOCOMPLIER

This invention relates to a photogrammetric method and apparatus for the stereoscopic examination of representation of featured surfaces and has particular reference to the stereoscopic presentation, examination and processing of aerial photographs or their derivatives as encountered in map making and photo-interpretation.

Although many different types of photogrammetric examination and plotting instruments have been known in the past, they all suffer from being very expensive if accuracy is required, and must provide correcting arrangements for tip and tilt of the photographs, projectors for obtaining the photographic images and special arrangements for writing or scribing and marking any maps produced from the stereoscopic pairs of photographs.

Photogrammetric plotting equipment in general is very complex, because the basic geometry of the photographic image is itself very complex. Even the simplest mapping tasks require sophisticated and expensive equipment and it is well known that the operating speed of such equipment is limited partly because of the inherent characteristics of the apparatus, and partly because of the preparatory steps which must be taken before the actual plotting can begin. The number of such costly units is thus usually limited in any map production process. The additional limitation with conventional plotters which is of particular importance is that they are very unsuited as drafting or scribing instruments. Consequently, the plotting is usually done in a preliminary form in pencil and the final drawing or scribing is performed in a separate operation requiring considerable additional outlay in time and money. This procedure is generally followed since it seems uneconomical to preform drafting operations on expensive equipment that could in any event be better done otherwise.

Normal known photogrammetric plotters cannot process photographic images which are not transparent or of large size and they are not therefore suitable for photo-interpretation work using the usual paper prints or enlargements, quite part from their expensive for this simple form of cartographic work.

The present invention enables the production of a low cost apparatus which we call a stereo-compiler for map making and photo-interpretation and can be in extremely simple form since it can employ usual or enlarged photographs, stereo-orthophotos or their equivalent. Stereo-orthophotos are rectified central perspective images with the center of projection at infinity. The geometry of the stereo-compiler can therefore become extremely simple as can its viewing system consistent with great accuracy and there are no restrictions in the type of the original photographs in size, focal distance, etc.

More particularly, in accordance with the invention, there is provided a method of map making which comprises viewing a pair of stereo-images to produce a three dimensional optical model bringing a floating measuring mark into conjunction with features of the model and plotting the map directly from movements of the measuring mark.

According to one aspect of the invention, there is provided a method of producing either a conventional or a stereo map, comprising viewing stereoscopically a conventional, first map manuscript and a second map manuscript having image details thereon shifted sideways along the direction of the X axis in relation to their elevation, and plotting superimposed details of said stereoscopic image on one or both of the map manuscripts.

According to a second aspect of the invention there is provided photogrammetric apparatus for the stereoscopic presentation of an optical model form from a pair of images which comprises, a main carriage having a first surface for receiving a first one of said images, and a second surface for receiving a second one of said images, means for moving said first and second surfaces in two directions at right angles with respect to one another in a plane parallel to the plane of said surfaces, and means for rotating one of said surfaces about an axis perpendicular to said two directions, a binocular viewing assembly for said first and second images, measuring mark means for each image, means permitting relative movement of said main carriage and said viewing assembly in two directions at right angles parallel to the planes of said first and second surfaces, while preventing relative rotation of said main carriage and said viewing assembly, means for moving said second surface in the direction optically towards the first surface for compensation of height differences of features in said optical model, and drafting means mounted fixedly with respect to said viewing assembly.

The apparatus of the invention is particularly adaptable to map making since it can have a very low friction movement, can be coupled directly to a writing instrument such as a scriber or drafting pen acting directly on one or both of the stereo-orthophotos or on transparent overlays. With the addition of templates or a steering device, it can be made to draft or scribe, cleanly, geometrically regular curves or lines. The procedure also permits complete direct plotting including spot elevations, contour lines and all planimetric details onto the stereo-photos or transparent overlays.

By using this approach, only certain details need be presented in symbolized form and the rest of the map content is provided by the orthophoto image itself. This leads to particularly efficient mapping techniques, the basic map content being produced in a fast orthophoto process, manual or automatic, whereas the contouring and a small amount of symbolizing are added in a scribed form suitable for immediate reproduction. Since the contours have already been marked at convenient intervals during the orthophoto production process, the overall accuracy of contouring is secured and duplicating of drafting is eliminated. Furthermore, because of its simplicity, no special knowledge in operating the stereo-compiler is necessary. When the precise geometry of stereo photographs is not needed, the apparatus of the invention may be used for plotting from the usual paper contact prints of aerial photographs or their enlargements, and the advantages of such an approach while suffering from the inaccuracies of tilt and tip, lie in the efficiency and quality of plotting while using indispensible stereo observation.

In accordance with the invention, there is also provided apparatus for the stereoscopic presentation of an optical model formed from a pair of stereoscopic images which comprises, a main carriage, a first surface on said main carriage for receiving an image of a stereo pair, a second surface on said main carriage movable in two directions at right angles with respect to one another in a plane parallel to the plane of said first surface and rotatable about an axis perpendicular to said two directions for receiving a second image of the stereo pair, a binocular viewing assembly for said first and second images, measuring mark means for each image, means permitting relative movement of said main carriage and said viewing assembly in two directions at right angles parallel to the planes of said first and second surfaces while preventing relative rotation of said main carriage and said viewing assembly, means for moving said second surface, in the direction towards the first surface for compensation of height differences of features in said optical model, and drafting means mounted fixedly with respect to said viewing assembly.

Figure 2:
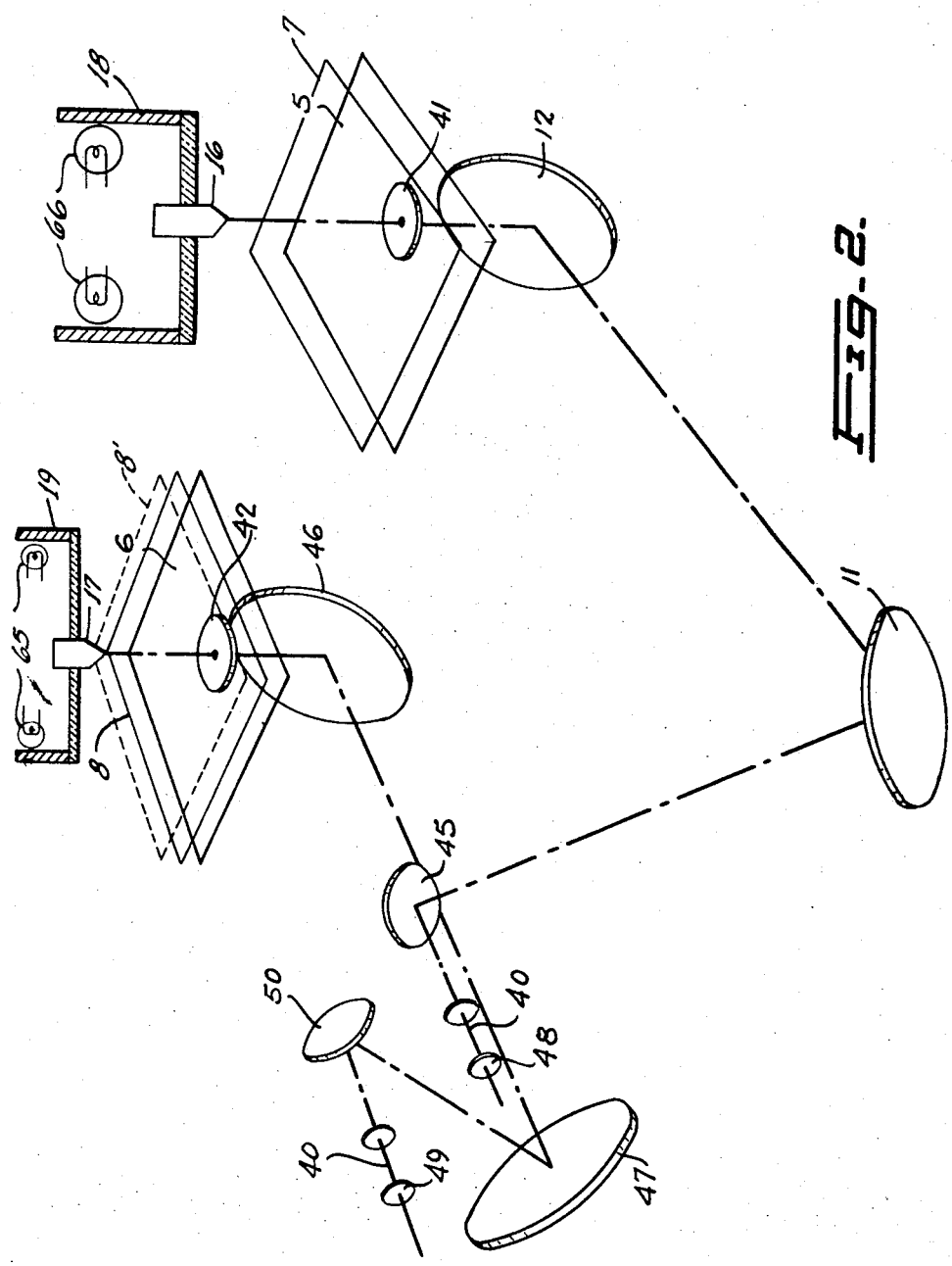

The invention will now be described with reference to the accompanying drawings in which, FIG. 1 shows a perspective partly broken view of the apparatus according to the invention, FIG. 2 shows diagrammetrically the optical layout of the binocular viewing system for the stereo-images.

Figure 3:
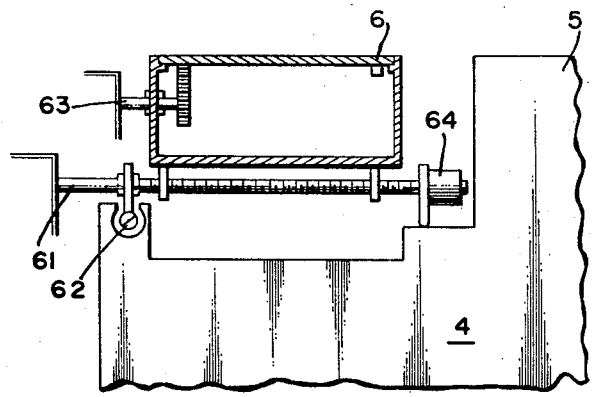
Figure 4:
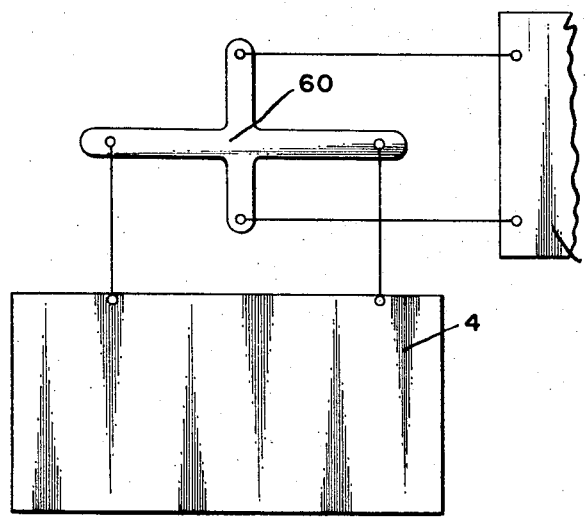

FIG. 3 is a sectional view of part of the apparatus of FIG. 1 along line 3—3 and FIG. 4 is a partial plan view of the apparatus of FIG. 1.

Having reference first to FIG. 1, a suitable supporting table 1 carries a glass plate 2 upon which is supported, by air bearing cushions 3 at three points, a main carriage 4. In the carriage 4 are two transparent supporting surfaces 5 and 6 for receiving a stereo image pair of photographs 7 and 8. The carriage 4 is attached to a pantograph parallelogram linkage system 60 (FIG. 4) to the table 1 so that rotation is prevented and the carriage can be moved in the X and Y directions only without changing its orientation.

The binocular viewing system 10 by means of mirrors 11 and 12 (details will be explained with reference to FIG. 2) allows observation of the two images 7 and 8 to synthesize an optical model of the original terrain surface. Although surface 5 is fixed with respect to the carriage 4, the surface 6 may be moved in the X and Y directions with respect to the carriage 4 by suitable means such as a screw drive 61 and 62 (FIG. 3) and rotated about a vertical axis by means 63 to provide for proper alignment of the image 8 with the image 7 when observed in the viewing system 10. Changes in height (Z co-ordinate) of the observed features are made by driving moving surface 6 in the X direction with respect to the carriage 4 which will provide the movements necessary to cause the viewed optical model to be brought into coincidence with the floating measuring mark (described later). The height can be read directly and the rotation of the Z screw drive recorded in some suitable fashion such as in electronic display unit 12.

The X and Y movements of the carriage 4 may be measured and recorded by any suitable conventional means such as scales, screws, racks, encoding devices, electrical or optical means etc. As an example the movements of the carriage 4 may be recorded by placing a grid 20 in the surface 2 and having an optical recognizing unit 21 passing over the grid and recording each traverse over the grid line in the X direction and independently in the Y direction.

The operator moves carriage 4 in the desired direction relatively to a measuring mark and drafting tools by holding in his hand or hands an extending handle 22.

If the grid marks are sufficiently closely spaced and the recording unit is connected to a counter unit, the X co-ordinate and the Y co-ordinate of the carriage 4 will be available at all times and may also be displayed on the unit 12. Suitable electronic read-out devices are Nixi (trademark) tubes which can give a visual display of the co-ordinates in arabic numerals.

Above the stereo-images 7 and 8 is arranged a bridge 15 mounted fixedly with respect to the table 1 and which carries pens or scribers 15 and 17 movable into contact with the respective orthophotos and coincident with the measuring mark for that photo. Illumination of the images is also conveniently provided at 65 and 66 (FIG. 2) in the housings 18 and 19 for the pens 16 and 17.

By making the undersides of the air bearings 3 flat, air, by pressing foot switch 34 can be led through suitable tubing 67 and under pressure to the underneath of these bearings so as to raise the entire carriage 4 a few microns above the level of the plate 12. Since the carriage is then floating on an air cushion at each of its supports, it can be moved very easily by one hand and being constrained by the pantograph linkage, remains angularly oriented in space. By using the air support, the amount of friction in the unit can be selected by the operator merely by varying the air pressure applied to the bearings 3.

By grasping the handle 22 on the face 23 of the carriage 4, the operator can move the carriage 4 in any desired direction relatively to the measuring marks seen in the optical system. If drafting or scribing of geometrically well defined lines is necessary, suitable templates 24 can be used. In this instance, a movable pin carried by the handle is lowered into a groove defined in the template of desired form. The template is clamped, for instance magnetically, to the surface 25 and can be arbitrarily oriented. Thus, the handle 22 and carriage 4 to follow lines defined by the template and clean drafting or scribing of desired information on one or both of images 7 or 8, or on transparent overlays, is executed by pens 16 or 17. Suitable electronic means can be provided for raising and lowering the pens or scribing tools 16 and 17 operated by foot switches such as 32 and 33. When a pen or scriber is in contact with an image 7 or 8, any movement of the carriage 4 will perforce be recording on that image.

As an alternative to the template use may be made of a steering device (not shown). In this case motion of carriage 4 is carried out by a driving mechanism which is in turn linked to a steering wheel or air craft type control column held by the operator. Thus, the operator can have the feeling of driving the measuring marks over the stereo model and can execute geometrically well defined movements which are far less exact when moving the carriage by hand.

Z-motion correction of the image 8 can be made by foot wheel 31 which moves the surface 6 in the X direction as required, preferably via a synchronous transmission 64 (FIG. 3). If there is a nonlinear scaling relationship in the Z-co-ordinate for the images, then it is simple to use an analogue or digital correction device or computer in conjunction with the synchronous transmission so that the X-co-ordinate of the carriage 4 can actuate the appropriate shift in X of image 8 when measuring the height (or Z-co-ordinate).

The third foot switch 34 is provided for switching the air supply to air bearing cushions 3 on or off thereby acting as a release or braking clamp as required.

Although air support for the carriage 4 has been shown and has been found to be particularly suitable and is a preferred embodiment, this is not necessary and ball slides or other ordinary low friction slides might be used instead.

The optical train is shown in more detail in FIG. 2 where 40 represents the binocular viewer which receives light from the images placed on surfaces 5 and 6. After passing through the measuring mark plate 41, the light goes to the respective mirrors 11, 12 and 45 and thence to eye piece 48. The light passing through plate 42 goes to mirror 46, 47 and 50 and thence to eyepiece 49. The magnification may be varied by suitable choice of eye pieces 48 and 49. By selecting mirrors of suitable sizes, a large portion of the image can be seen and for more detailed examination, the stronger magnification in the eye pieces 48 and 49 may be used. The measuring mark plates 41 42 are placed as closely adjacent as possible to the images to be viewed on the surfaces 5 and 6. When the measuring marks found on plates 41 and 42 are viewed through the binocular assembly, they appear as a single mark floating in the space in which the optical model formed by the stereophotos is present. By placing this measuring mark on any point of the stereo model, its free co-ordinates X, Y and Z can be measured and recorded. Similarly, by following with the measuring mark any features of the stereo model, a graphical presentation (a map) can be achieved. A map drawing or writing instrument may be attached to the handle 22 if desired.

In the apparatus shown, the carriage 4 has been made movable, and the entire optical system and scribers or pens are fixed, but an alternative solution could allow a movable drafting unit and measuring mark with at least a partly movable viewing system. If the viewing system is made movable and the carriage fixed, the scribing instruments would be attached to the viewing system assembly.

It can thus be seen that the instrument may be used as a photogrammetric plotter, a cartographic drafting instrument or an instrument for photo-interpretation work. It can accept photographs in any arbitrary form on film, glass, plates, paper or prints, black and white or color. The photographs may be a regular stereo-orthophotograph or alternatively pseudo stereo-orthophotographs. Pseudo stereo-ortho photographs are a pair of orthophotos from overlapping photographs they may be a pair of orthophotographs with shifts of image features proportional to terrain height made from two adjacent photographs, or the combination of an orthophoto and an enlarged copy of the original adjacent photograph. This may find application in mapping of generally level areas where occasional slopes of the surface of the terrain is not important.

The apparatus according the invention may be used to produce a conventional or stereo map.

The apparatus according to the invention may be used to plot details of the stereoscopic image on an overlay 8' (FIG. 2). This is particularly useful in the production of anaglyphic maps.

Whilst one of the surfaces 5 and 6 is shown mounted movably in the X and Y directions and rotatable, one may be movable in the X direction and the other movable in the Y direction, with either one or both being rotatable.

The embodiments of the invention in which an exclusive property or privilege is claimed are defined as follows:

1. Apparatus for presenting a stereoscopic optical model of a featured surface having horizontal and vertical dimensions from a pair of images representative of the featured surface, and for scribing information details directly with respect to at least one of said images which comprises:
   a main carriage having a first surface for receiving a first one of said images, and a second surface for receiving the second of said images,
   means for moving said first and second surfaces in two directions at right angles with respect to one another in a plane parallel to the plane of said surfaces, and
   means for rotating one of said surfaces about an axis perpendicular to said two directions,
   a binocular viewing assembly for said first and second images,
   spacially located measuring mark forming means in said viewing assembly for each image, said viewing assembly permitting viewing an optical model of said featured surface formed by said images and also viewing of a measuring mark spacially located with respect to said optical model,
   means for permitting relative movement of said main carriage and said viewing assembly in two directions at right angles parallel to the planes of said first and second surfaces, while preventing relative rotation of said main carriage and said viewing assembly,
   means for moving said second surface in the direction optically towards coincidence with the first surface but in a plane parallel to the first surface for vertical movement of said optical model with respect to said measuring mark,
   and scribing means mounted on said apparatus fixed with respect to said viewing assembly and cooperable with said main carriage to effect direct scribing action with respect to said first surface upon movement of said main carriage with respect to said viewing assembly.

2. An apparatus as defined in claim 1 including illumination means for said pair of images.

3. Apparatus as defined in claim 1 including, support means for said main carriage comprising, a flat surface below said carriage parallel to the plane of said first surface and including air bearing means between said flat surface and said main carriage.

4. Apparatus as defined in claim 1, said scribing means being adapted for scribing said information details directly onto an overlay placed over the respective image.

5. Apparatus as defined in claim 1, said scribing means being coincident optically with the measuring mark forming means for said one image for scribing information details directly at said one image coincident with that measuring mark forming means.

6. Apparatus as defined in claim 1 comprising:
a second said scribing means mounted on said apparatus fixed with respect to said viewing assembly and cooperable with said second surface for effecting scribing action with respect to said second surface upon movement of said main carriage with respect to said viewing means.

7. Apparatus as defined in claim 6, each of said scribing means being coincident optically with the measuring mark forming means for its respective image for scribing information details directly at its respective image coincident with its respective measuring mark forming means.

8. Apparatus as defined in claim 1, including support means for said main carriage comprising,
a flat surface below said carriage parallel to the plane of said first surface and including air bearing means between said flat surface and said main carriage, and wherein the air bearing means comprises a cylinder having one end face coincident with said flat surface,
and means for leading air under pressure to the interior of said cylinder for air support of said bearing means between said end face and said flat surface.

9. Apparatus as defined in claim 1, including support means for said main carriage comprising,
a flat surface below said carriage parallel to the plane of said first surface and including air bearing means between said flat surface and said main carriage, wherein said two directions at right angles comprise the X and Y stereo pair coordinates for the pair of images, the line joining the measuring mark forming means for each image being in the X direction.

10. Apparatus as defined in claim 1, including support means for said main carriage comprising,
a flat surface below said carriage parallel to the plane of said first surface and including air bearing means between said flat surface and said main carriage, the viewing assembly receiving light transmitted through the first and second surfaces, and illumination means for said images above said surfaces.

11. Apparatus as defined in claim 1, comprising,
coordinate recording means for recording and displaying the movements of said main carriage in said two directions at right angles and for displaying the height coordinate of said optical model, corresponding to the movement of said second surface with respect to said first surface.

12. Apparatus as defined in claim 1, comprising,
a template cooperable with said main carriage and mounted fixedly with respect to said viewing assembly for defining movements of said main carriage executed in accordance with said template for scribing of said information details in predetermined form.

13. Apparatus as defined in claim 1 including remote operable means for lowering said scribing means into scribing position.

* * * * *